United States Patent
Hamada

(10) Patent No.: US 8,531,621 B2
(45) Date of Patent: Sep. 10, 2013

(54) BACKLIGHT DEVICE AND LIQUID CRYSTAL DISPLAY APPARATUS USING SAME

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 776 days.

(21) Appl. No.: 12/522,768

(22) PCT Filed: Sep. 11, 2007

(86) PCT No.: PCT/JP2007/067643
§ 371 (c)(1),
(2), (4) Date: Jul. 10, 2009

(87) PCT Pub. No.: WO2008/096470
PCT Pub. Date: Aug. 14, 2008

(65) Prior Publication Data
US 2011/0176083 A1   Jul. 21, 2011

(30) Foreign Application Priority Data
Feb. 5, 2007   (JP) .................................. 2007-025067

(51) Int. Cl.
*G02F 1/1333*   (2006.01)
*G02F 1/1335*   (2006.01)

(52) U.S. Cl.
USPC .................. 349/58; 349/61; 349/65; 362/612

(58) Field of Classification Search
USPC ................................. 349/58, 61–65; 362/612
See application file for complete search history.

(56) References Cited

U.S. PATENT DOCUMENTS

| | | | |
|---|---|---|---|
| 7,667,787 B2 * | 2/2010 | Mahama et al. | 349/64 |
| 7,742,121 B2 * | 6/2010 | Mori et al. | 349/58 |
| 7,798,701 B2 * | 9/2010 | Mori et al. | 362/634 |
| 2006/0007476 A1 | 1/2006 | Ogushi et al. | |
| 2006/0163596 A1 * | 7/2006 | Kim et al. | 257/98 |
| 2006/0164838 A1 | 7/2006 | Park et al. | |
| 2007/0002590 A1 * | 1/2007 | Jang et al. | 362/633 |
| 2009/0128732 A1 * | 5/2009 | Hamada | 349/58 |

FOREIGN PATENT DOCUMENTS

| | | |
|---|---|---|
| CN | 2821373 Y | 9/2006 |
| JP | 2003-141906 A | 5/2003 |
| JP | 2004-342587 A | 12/2004 |
| JP | 2005-115131 A | 4/2005 |
| JP | 2005-340065 A | 12/2005 |
| JP | 2005-353498 A | 12/2005 |
| JP | 2006-24615 A | 1/2006 |
| JP | 2006-30258 A | 2/2006 |
| JP | 2006-278077 A | 10/2006 |
| JP | 2006-302581 A | 11/2006 |
| JP | 2007-5302 A | 1/2007 |
| WO | WO 2006/085408 A1 | 8/2006 |

* cited by examiner

*Primary Examiner* — Edward Glick
*Assistant Examiner* — David Chung
(74) *Attorney, Agent, or Firm* — Birch, Stewart, Kolasch & Birch, LLP

(57) ABSTRACT

A backlight device (100) includes: a case (1); a plurality of LED modules (2) provided in series on a bottom portion (1a) of the case (1); a reflective sheet (3); a diffusing plate (4); and an optical sheet (5). At the bottom portion (1a) of the case (1), four recessed portions (10) are formed in a horizontal direction of a display screen, and each of the LED modules 2 is fixed thereon with screws (11). At opposite ends of the recessed portion (10), opening portions (10a) and (10b) each having a lid member (13) are formed, thus making it possible to remove the LED modules (2) without disassembling the backlight device (100).

14 Claims, 7 Drawing Sheets

BACKLIGHT DEVICE AND LIQUID CRYSTAL DISPLAY APPARATUS USING SAME

BACKGROUND OF THE INVENTION

1. Field of the Invention

The present invention relates to a backlight device for illumination in a display apparatus and a liquid crystal display apparatus equipped with such a backlight device, and more particularly to a direct-type backlight device in which a plurality of light source modules are disposed at a bottom portion of its backlight case.

2. Description of the Related Art

In recent years, instead of cathode ray tubes conventionally used as display apparatuses, a so-called flat panel display has become the mainstream, and its market has been increasingly expanding. Among others, liquid crystal display apparatuses are characterized by slimness, lightness in weight, low power consumption and high definition, and are used in a wide range of fields including televisions, personal computers, digital cameras, mobile telephones, and the like. A liquid crystal display apparatus is composed of a liquid crystal panel having liquid crystal sealed between paired opposite electrode boards, a backlight device illuminating the liquid crystal panel from behind, and various circuit boards for use in driving the liquid crystal panel.

Conventionally, a direct-type backlight device having a plurality of cold cathode fluorescent lamps (CCFLs) arranged right under liquid crystal modules has been used as a backlight device incorporated in a large-screen liquid crystal display apparatus. However, a cold cathode fluorescent lamp has problems: a high voltage is required in a driving inverter; mercury is used; a color reproduction range is small, etc., and thus, nowadays, as disclosed in Patent Documents 1 and 2, direct-type backlight devices using a light emitting diode (hereinafter, referred to as LED) as a light source are being developed.

How direct-type backlight devices have conventionally been constructed using an LED will be described. FIG. 11A is a side cross-sectional view of a liquid crystal display apparatus using such a direct-type backlight device, FIG. 11B is a plan view showing an interior of the direct-type backlight device as seen from a light-emitting-surface side (from the left side of FIG. 11A). As shown in FIGS. 11A and 11B, a backlight device 100 includes: a case 1; a plurality of LED modules 2 arranged in parallel on a bottom surface 1a of the case 1; a reflective sheet 3; a diffusing plate 4; and an optical sheet 5. Incidentally, from FIG. 11B, descriptions of the reflective sheet 3, diffusing plate 4 and optical sheet 5 are omitted.

The LED modules 2 each have a plurality of LEDs 6 arranged in a row on an LED mounting board 7, and a plurality of such LED modules 2 (here, the number thereof being five) are arranged in a horizontal direction of a display screen (in a long-side direction) thereby to form a planar light source that illuminates an entire area of a display portion of a liquid crystal panel 9. The reflective sheet 3 is laid on an entire area of the bottom portion 1a so as to fill up gaps between the LEDs 6, so that light emitted from the LEDs 6 is efficiently reflected toward the liquid crystal panel 9 (to the left in FIG. 11A).

The diffusing plate 4 and optical sheet 5 are for making light emitted from the LEDs 6 uniform in terms of luminance distribution, and are so disposed as to cover a front surface of the case 1. As the diffusing plate 4, a transparent plate, formed out of an acrylic-based resin, having concave and convex portions so provided on its surface as to scatter light or a plate obtained by including light scattering particles into an acryl-based resin and molding it into a plate shape is used. In front side of the diffusing plate 4 (to the left in FIG. 11A), the liquid crystal panel 9 is disposed with the optical sheet 5 such as a prism sheet (light collecting sheet) in between, thereby to make it possible to display a desired image.

In a case where such a direct-type backlight device as described above is used for illumination in a large-screen liquid crystal panel, it is necessary to use a high-luminance LED, to which a large current equal to or more than several hundreds of mA is fed. When heat generated as the LEDs use this current is accumulated without being discharged to the outside of the device, LEDs' illumination characteristics might be lowered, with the results that uneven luminance or color variation occurs, or as the case may be, the LEDs themselves might be broken. To overcome this, as shown in FIG. 11A, heat dissipation fins are disposed on a rear surface of the case 1, and in addition, a cooling fan (not shown) sending out air to the heat dissipation fins 8 is disposed, thereby to achieve heat dissipation with increased efficiency and thus to prevent the LED modules 2 from experiencing a rise in temperature.

Moreover, some solutions have been proposed for eliminating the need for increasing the size of a backlight device owing to the provision of the heat dissipation fins and cooling fan; Patent Document 3 discloses a side-lighting-type backlight device including a heat transfer device having one end thereof coupled to a rear surface of an LED mounting board and a flat cooling fan cooling a heat dissipation portion coupled to the other end of the heat transfer device, the backlight device being capable of entirely cooling, with uniformity using the single fan, LEDs arranged laterally.

Patent Document 1: JP-A-2005-115131
Patent Document 2: JP-A-2006-278077
Patent Document 3: JP-A-2005-340065

SUMMARY OF THE INVENTION

Problems to be Solved by the Invention

However, when it is identified during an inspection process before a product is shipped that there is a variation in LEDs' illumination characteristics, or when an LED in a backlight device being used by a user is broken, since in the backlight device constructed as conventionally practiced, the LED modules are fixed on a bottom surface of its case, it is necessary to disassemble the backlight device to replace that LED or the whole LED module with that LED, thus leading to increased complexity of replacement work.

A construction of a backlight device as shown in FIG. 11 necessitates provision of dissipation fins 8 on an entire area of a rear surface of a case 1, and moreover, provision of more than one or a large-size cooling fan for sending out air entirely to the heat dissipation fins 8; this prevents the backlight device from being made slim and compact. Moreover, when a method disclosed in Patent Document 3 is applied to a direct-type backlight device including a plurality of LED mounting boards, inconveniently a construction of a heat transfer device becomes increasingly complex. In addition, it still requires a space for disposing a heat transfer device and a fan, which becomes an obstacle from a viewpoint of achieving slimness and compactness of a liquid crystal display apparatus.

In view of the above-identified problems, an object of the present invention is to provide a slim and compact, direct-type backlight device that is superior in an effect of dissipating heat generated from a light source and whose light source or light source module is easily replaced, and a liquid crystal display apparatus equipped with such a backlight device.

Means for Solving the Problem

To achieve the above-described object, according to the present invention, a backlight device includes: a light source module having a plurality of light sources arranged on a mounting board; and a case in which a plurality of such light source modules are disposed, the case having a bottom portion thereof formed of a metal plate in which a plurality of first recessed portions are so formed as to permit a plurality of such light source modules to be disposed respectively therein.

With this construction, it is possible to increase a surface area of the bottom portion of the case, leading to an enhanced heat dissipation effect, with no use of a heat dissipation fin and cooling fan. Moreover, it is possible to form the first recessed portions easily by using press-processing.

According to the present invention, an outer surface of the bottom portion is so treated as to increase emissivity. Note that in this specification, emissivity is a measure of a material's ability, represented by a numerical value, to radiate heat (infrared rays) therefrom well.

With this construction, it is possible to dissipate heat through the bottom portion with increased efficiency.

According to the present invention, in the backlight device constructed as described above, at the bottom portion, a second recessed portion is formed in which the light source module is not disposed.

With this construction, it is possible to further increase the surface area of the bottom portion, with the result that the heat dissipation effect is more enhanced accordingly.

According to the present invention, in the backlight device constructed as described above, an opening portion having an openable lid member is provided at least at one end of the first recessed portions.

With this construction, it is possible to replace the light source or light source module from the outside of the backlight device without disassembling it; accordingly, replacement work is done with greatly increased efficiency. Moreover, the provision of the lid member makes it possible to prevent not only light leakage from the opening portion but also entrance of dirt and the like into the case.

According to the present invention, in the backlight device constructed as described above, the plurality of light source modules are arranged in series in each of the first recessed portions.

With this construction, it is possible to reduce the size of a light source module, which may be replaced in whole if including a light source with a problem; this helps reduce maintenance costs.

According to the present invention, in the backlight device constructed as described above, an opening portion is provided at each end of the first recessed portions, and as said light source module, two light source modules are arranged in series in each of the first recessed portions.

With this construction, it is possible to remove those two light source modules through the opening portions close thereto respectively, thus facilitating light source replacement work. Moreover, only one half of the light source module can be replaced at a time when the light source module needs to be replaced in whole; this helps reduce maintenance costs.

According to the present invention, in the backlight device constructed as described above, the plurality of light source modules are coupled together by a coupling mechanism.

With this construction, in a large-size backlight device, it is easy to pull out and insert the light source modules disposed at about the center of the recessed portions.

According to the present invention, in the backlight device constructed as described above, the first recessed portions have a depth greater than a thickness of the light source module.

With this construction, it is possible to remove the light source modules without trouble.

According to the present invention, in the backlight device constructed as described above, the light sources are LEDs.

With this construction, even in a case a high-luminance LED is used to which a large current is fed, it is possible to enhance the heat dissipation effect and thus to prolong a lifetime of the LED, with a simple construction.

According to the present invention, a liquid crystal display apparatus is equipped with the backlight device constructed as described above.

With this construction, it is possible to provide a superior liquid crystal display apparatus that is easily manufactured and maintained, that is resistance to deterioration with heat from its light source, and that meets demand for achieving slimness and compactness.

LIST OF REFERENCE SYMBOLS

Figure 1:
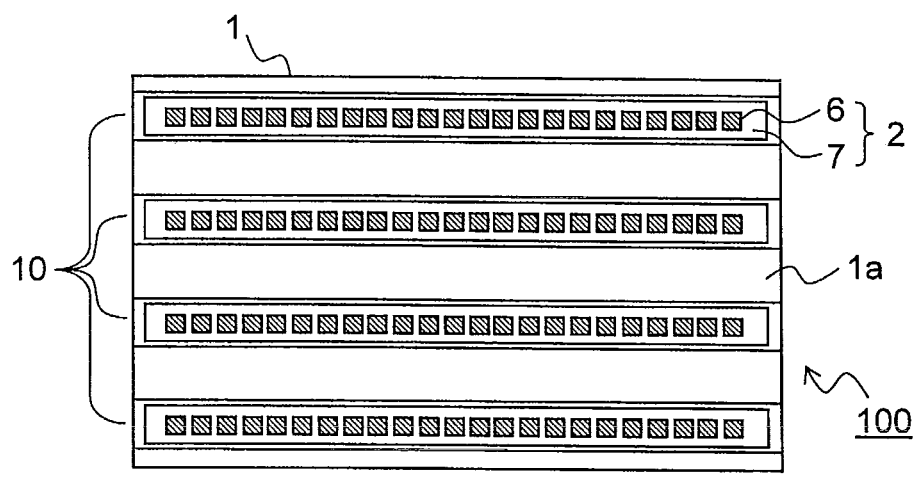
[FIG. 1] is a plan view showing an interior of a backlight device according to a first embodiment of the present invention.

1 Case
1a Bottom portion
2 LED modules
3 Reflective sheet
4 Diffusing plate
5 Optical sheet
6 LEDs (light emitting diodes)
7 LED mounting boards 9 Liquid crystal panel
10 Recessed portions (first recessed portions)
10a, 10b Opening portions
11 Screws
13 Lid members
15 Recessed portions for heat dissipation (second recessed portions)
100 Backlight device

DETAILED DESCRIPTION OF THE INVENTION

Figure 2:
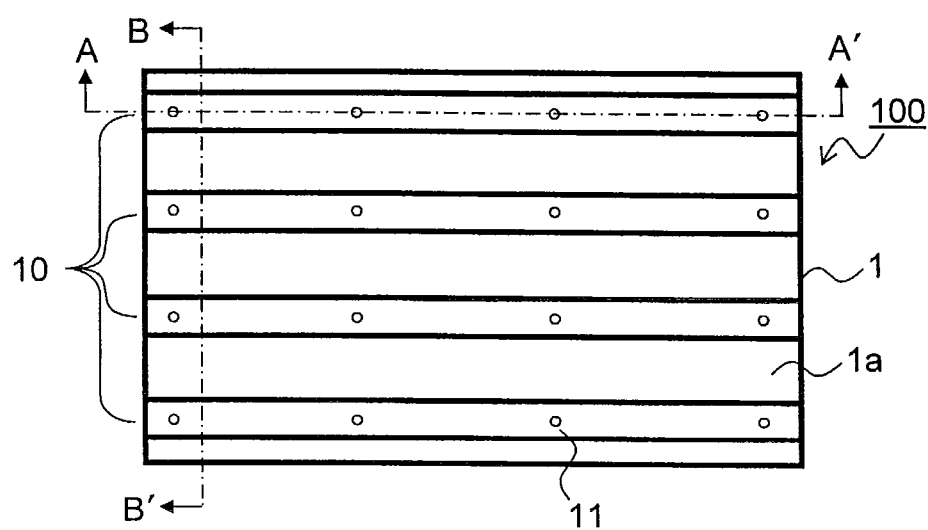
[FIG. 2] is a rear view of the backlight device of the first embodiment.
Figure 3:
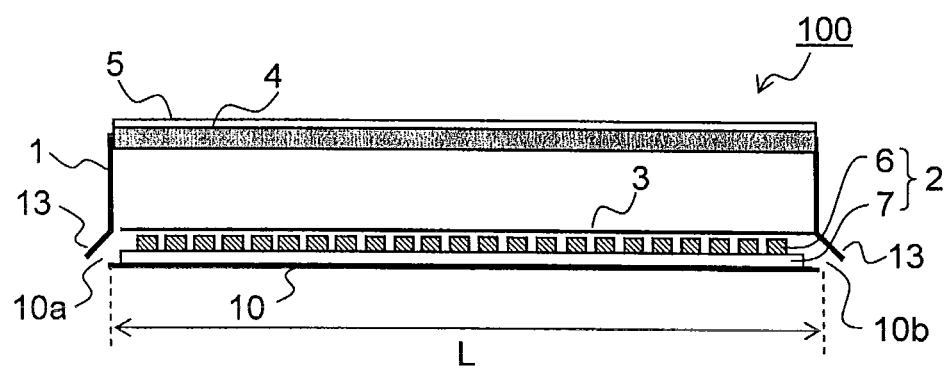
[FIG. 3] is a horizontal cross-sectional view of the backlight device of the first embodiment.
Figure 4A:
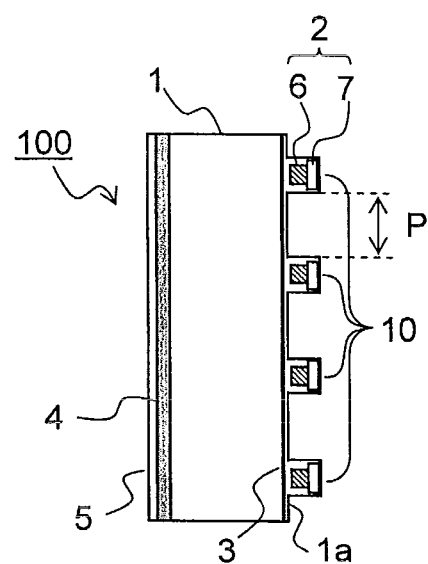
[FIG. 4A] is a vertical cross-sectional view of the backlight device of the first embodiment.
Figure 4B:
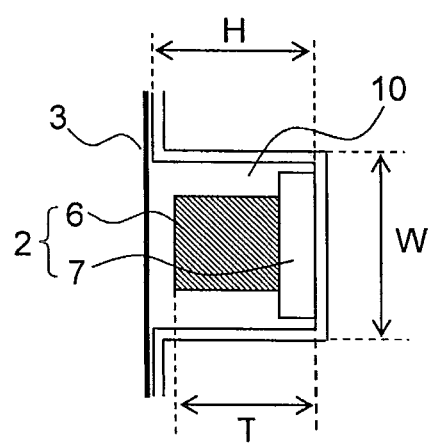
[FIG. 4B] is a partially enlarged view showing an LED module in FIG. 4A and the vicinity thereof.
Figure 5:
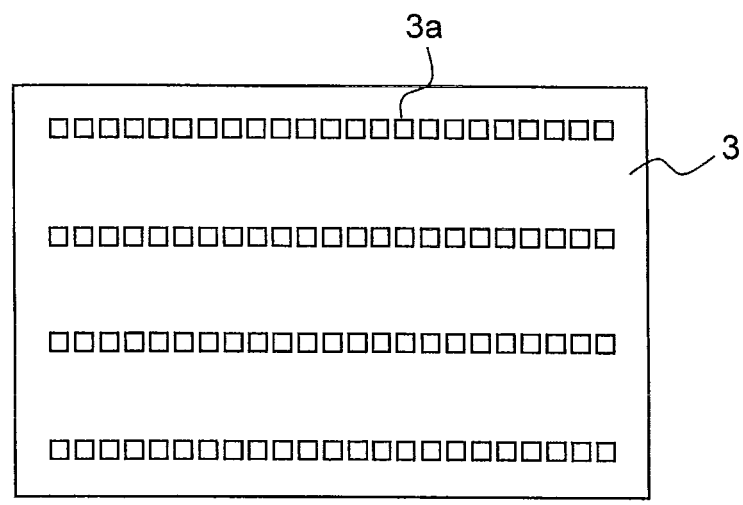
[FIG. 5] is a plan view showing by way of example a reflective sheet for use in the backlight device of the first embodiment.
Figure 11A:
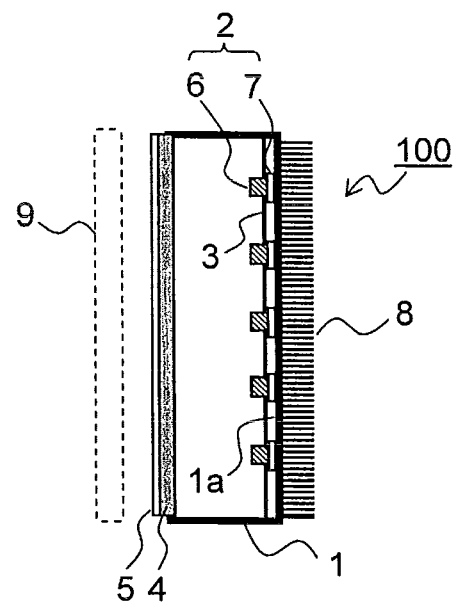
[FIG. 11A] is a side cross-sectional view of a conventional direct-type backlight device.
Figure 11B:
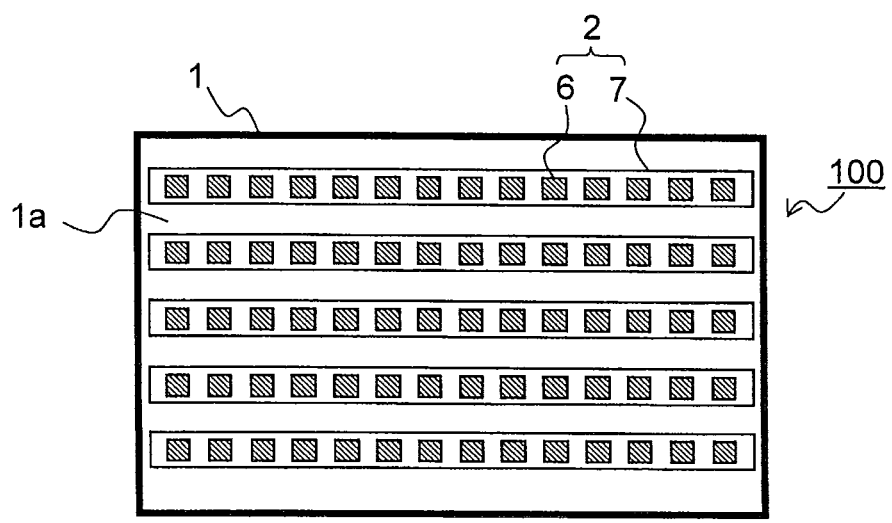
[FIG. 11B] is a plan view showing an interior of a conventional direct type backlight device.

Hereinafter, embodiments of the present invention will be described with reference to the drawings. FIG. 1 is a plan view showing an internal construction of a backlight device according to a first embodiment of the present invention, FIG. 2 is a rear view of the backlight device, FIG. 3 is a horizontal cross-sectional view of the backlight device (taken along line A-A' in FIG. 2), FIG. 4A is a vertical cross-sectional view of the backlight device (taken along line B-B' in FIG. 2), FIG. 4B is a partially enlarged view showing an LED module in FIG. 4A and the vicinity thereof, and FIG. 5 is a plan view of a reflective sheet. The same parts as found in a conventional example in FIG. 11 will be identified by the same reference numerals, and no description thereof will be given.

An LED module 2 is so formed as to have a plurality of LEDs 6 (here, the number thereof being 23) arranged in a straight line on an LED mounting board 7. In this example, four LED modules 2 are arranged in parallel in a horizontal direction of a display screen (in a left/right direction in FIG. 1) thereby to form a planar light source having 92 LEDs 6 arrayed in a matrix. As the LEDs 6, for example three primary colors—red, blue and green—LED elements may be grouped into one thereby to form each of the LEDs 6, or three different LEDs 6, namely red color LEDs, blue color LEDs, and green color LEDs are repeatedly disposed in order such that color alignment is substantially symmetrical, thereby to form a white-color planar light source. Or it may be a white-color planar light source using white-color LEDs alone.

The LED mounting board 7 feeds power and a control signal to the LEDs 6, and functions as a heat dissipation plate for discharging heat generated from the LEDs 6. As a material of the LED mounting board 7, metals such as aluminum or the like with high heat conductivity are preferable. The LED mounting board 7 includes other components such as connectors and the like to which cables extending from a power source and a control circuit are connected, and circuits; however, no description thereof will be given here for the sake of convenience.

The reflective sheet 3, having window portions 3a formed in positions corresponding to each of the LEDs 6 as shown in FIG. 5, is laid on a bottom portion 1a so as to extend between the LEDs 6 leaving no gap therebetween. As the reflective sheet 3, an aluminum plate, a white-color polyester plate in which a light scattering material is mixed, a polyester plate with a metal such as aluminum or silver deposited thereon, or the like is used.

On the bottom portion 1a of the case 1, four recessed portions 10 each formed in a squared-U shape in a cross section are formed in a horizontal direction of a display screen, and the LED modules 2 are fixed inside the recessed portions 10 with four screws 11 respectively. Incidentally, from FIGS. 3 and 4, descriptions of the screws 11 are omitted. As shown in FIG. 3, at opposite ends of the recessed portion 10, opening portions 10a and 10b are formed respectively, with a lid member 13 openably attached thereto.

The lid member 13 is for preventing light from being leaked to the outside of the case 1 or dirt, dust and the like from intruding into the case 1. Although there is no particular limitation on a material of the lid member 13, it is preferable that it have heat resistance to withstand heat generated from the LED modules 2, and that its inner surface efficiently reflect light from the LEDs 6. For example, a white-color polyester resin which is used in a plastic frame of a liquid crystal display unit, a white-color rubber which is used in an electrode portion of a cold cathode fluorescent lamp, or the like is preferably used.

Next, a replacement procedure for a case where any of the LEDs 6 is broken, or a case where illumination characteristics are altered will be described. First, the LED module 2 in which a target LED 6 to be replaced is disposed is identified, and the screws 11 fixing that LED module 2 are loosened and removed. Then, one of the lid members 13 is opened, and through the opening portion 10a (or 10b), that LED module 2 is pulled out. After the LED 6 to which a problem has occurred is replaced with a new LED 6 or the whole LED module 2 is replaced with a new one, the LED module 2 is inserted in a predetermined position inside the case 1 through the opening portion 10a (or 10b), and is then fixed with the screws 11 again; thereafter, the lid member 13 is closed.

Thus, it is possible to replace the LED 6 or the LED module 2 from the outside of the backlight device 100 without disassembling it; accordingly, replacement work is done with greatly increased efficiency. Note that although the screws 11 are used here so as to fix the LED modules 2, any other fixing member may be used. Moreover, although the lid members 13 closing the opening portions 10a and 10b of the recessed portions 10 are made openable, the lid member at either one side alone may be made openable.

For the recessed portions 10, a width W, depth H and pitch P may be set up appropriately in accordance with the shape of the LED modules 2 and the interval between them. If the recessed portion 10 has a depth equal to or smaller than a thickness T of the LED module 2, the LED module 2 may be caught by the window portions 3a of the reflective sheet 3, making it difficult to insert and remove the LED module 2 without trouble, and possibly leading to breakage of a light emitting surface of the LED 6. Thus, as shown in FIG. 4B, it is preferable that the recessed portion 10 have the depth H greater than the thickness of the LED module 2.

As a material of the bottom portion 1a of the case 1, a metal plate is used that is formed of a metal such as aluminum, stainless steel (SUS) and galvanized steel. Thus, heat generated as the LEDs 6 are driven is dissipated via the bottom portion 1a, making it possible to effectively prevent deterioration or breakage of the LEDs 6. Moreover, the recessed portions 10 can be formed easily by press-processing. Among others, an aluminum plate, having especially high heat conductivity and easily processed, is preferably.

Moreover, the formation of the recessed portions 10 leads to the bottom portion 1a having an increased surface area and hence to greatly increased efficiency of discharging heat. For example, on the assumption that the recessed portions 10 have the pitch P of 40 mm, the width W of 15 mm and the depth H of 8 mm, and that the bottom portion 1a has a long side of 400 mm, the surface area is then estimated as follows: $(8 \times 2+15+40) \times 400 \times 4=113,600$ mm$^2$. On the other hand, if no recessed portion 10 is provided, the surface area of the bottom portion 1a is estimated as follows: $(15+40) \times 400 \times 4=88,000$ mm$^2$. That is, the formation of the recessed portions 10 leads to the bottom portion 1a having the surface area increased by approximately 30%.

Thus, it is possible to enhance a heat dissipation effect with no use of a heat dissipation fin and cooling fan, and hence to reduce the number of parts and the number of steps in assembly. Along with the construction of this embodiment, a heat dissipation fin and/or cooling fan may be so provided as to further enhance the heat dissipation effect. Even in that case, more compact heat dissipation fins and/or cooling fan than conventional ones offer a sufficient cooling effect, thus making it possible to achieve slimness and compactness of a resultant backlight device.

To further enhance the effect of discharging heat from the bottom portion 1a, an outer surface of the bottom portion 1a is so treated as to increase emissivity. Emissivity is a measure of an object's ability, represented by a numerical value, to radiate heat (infrared rays) therefrom well; the emissivity of the object (blackbody) that radiates heat most is one, whereas that of the object (mirror-surface body) that does not radiate heat by itself but perfectly reflects heat radiation from its environment is zero. General substances have an emissivity between zero and one, and for the same substance, the coarser its surface is, the higher an emissivity it exhibits.

Examples of treatment for increasing emissivity include a method of coating the outer surface of the bottom surface 1a with a black paint and, for a case where the case 1 is made of aluminum, a method of black-anodizing it. Moreover, the outer surface of the bottom surface 1a may be made coarse.

Figure 6:
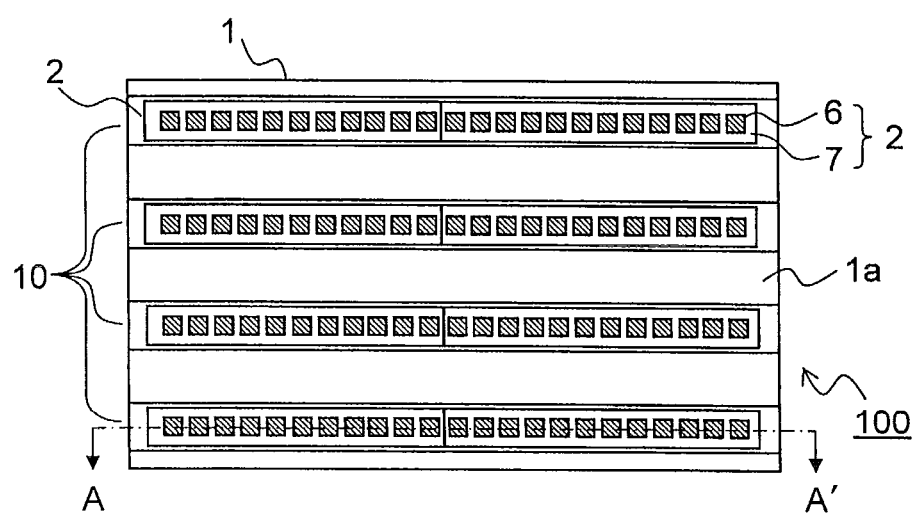
[FIG. 6] is a plan view showing an interior of a backlight device according to a second embodiment of the present invention.
Figure 7:
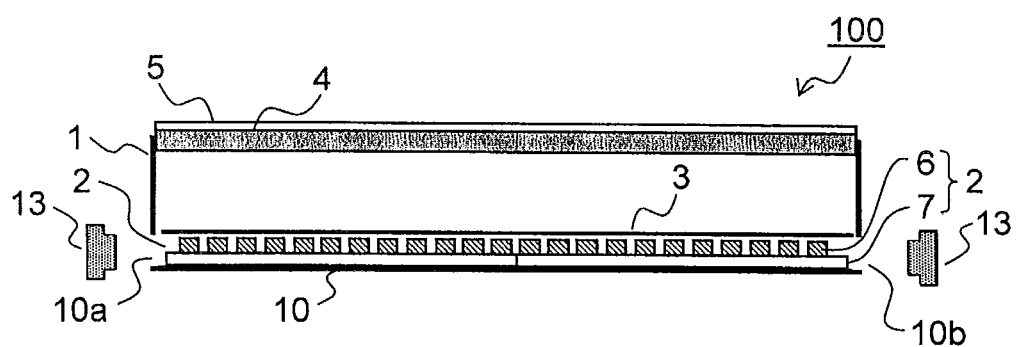
[FIG. 7] is a horizontal cross-sectional view of the backlight device of the second embodiment.

FIG. 6 is a plan view showing an internal construction of a backlight device according to a second embodiment of the present invention, and FIG. 7 is a horizontal cross-sectional view (taken along line A-A' in FIG. 6) of the backlight device. The same parts as those in both FIGS. 1 and 3 showing the first embodiment will be identified by the same reference numerals, and no description thereof will be given. In this embodiment, the LED module 2 is divided into two portions in the horizontal direction of the display screen, and the LED modules 2 are arranged in series in the recessed portions 10, two for each of the recessed portion. As shown in FIG. 7, the lid members 13 of a fit-in type that is formed out of an elastic material are used. Materials of the other members forming the backlight device 100 and a construction thereof, a shape and dimension of the recessed portions 10, and a method of forming them are the same as in the first embodiment.

With the construction as described above, it is possible to remove those two LED modules 2 through the left and right opening portions 10a and 10b respectively; this makes it easy to replace the LED 6 to which a problem has occurred, as compared with the first embodiment. Moreover, when the whole LED module 2 including the LED 6 with a problem is replaced, it is simply necessary to replace a half of the LED module 2 of the first embodiment, thus making it possible to reduce maintenance costs as well.

In the case of a large-size backlight device, each of the LED modules 2, if constructed to be divided into two portions, becomes extremely long, which is a disadvantage from a viewpoint of manufacturing and replacement costs. Consequently, the LED module 2 disposed in each of the recessed portions 10 may be divided into three or more portions. This helps achieve further compactness of the LED modules 2, leading to further reduced parts costs. In this case, provision of a coupling mechanism such as a wire harness coupling the LED modules 2 together makes it easy to pull out and insert the LED modules 2 disposed at about the center of the recessed portions 10.

Figure 8:
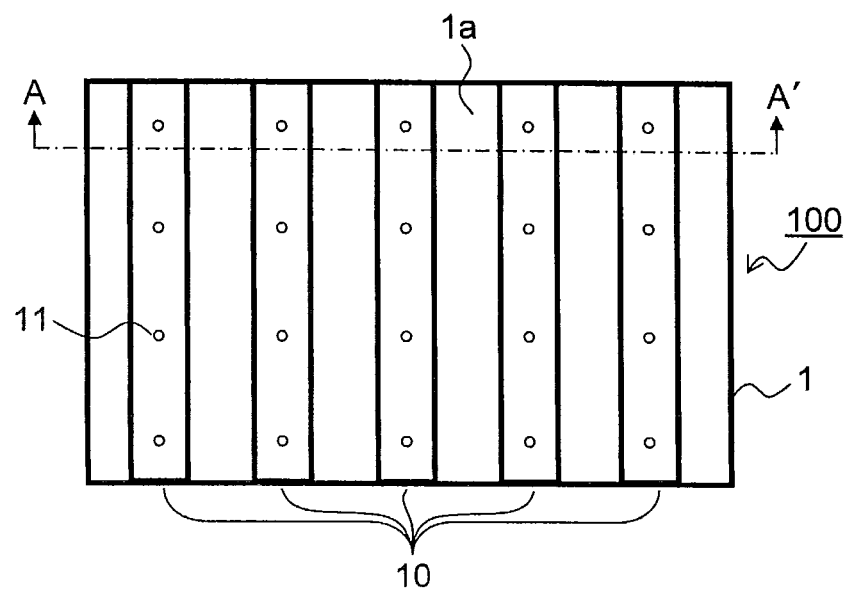
[FIG. 8] is a rear view of a backlight device according to a third embodiment of the present invention.
Figure 9:
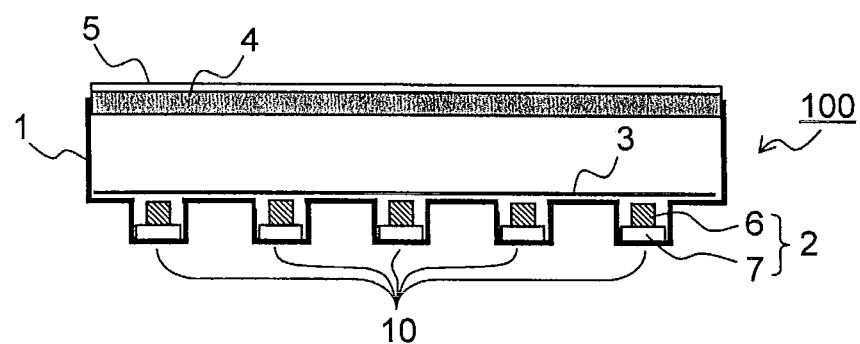
[FIG. 9] is a horizontal cross-sectional view of the backlight device of the third embodiment.

FIG. 8 is a rear view of a backlight device according to a third embodiment of the present invention, and FIG. 9 is a horizontal cross-sectional view (taken along line A-A' in FIG. 8) of the backlight device. In this embodiment, five recessed portions 10 are formed on the bottom portion 1a of the case 1 in a vertical direction of the display screen, so that the LED modules 2 can be pulled out and inserted from above and below.

As in the first embodiment, in the third embodiment as well, it is possible to replace the LEDs 6 and the LED modules 2 without disassembling the backlight device 100, leading to greatly increased efficiency of the replacement work. Moreover, the surface area of the bottom portion 1a is increased, thus making it possible to enhance an effect of discharging heat with no use of a heat dissipation fin and cooling fan.

Figure 10:
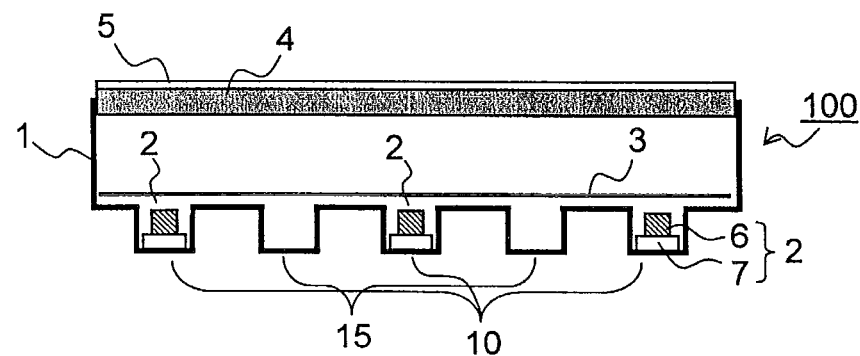
[FIG. 10] is a horizontal cross-sectional view of a backlight device according to a fourth embodiment of the present invention.

FIG. 10 is a horizontal cross-sectional view of a backlight device according to a fourth embodiment of the present invention. The same parts as those in FIG. 9 showing the third embodiment will be identified by the same reference numerals. In this embodiment, the LED modules 2 are disposed in three recessed portions 10 out of the five recessed portions formed on the bottom portion 1a, and the other two serve as recessed portions 15 (for heat dissipation) in which no LED module 2 is disposed.

In this embodiment, the recessed portions 15 for heat dissipation function as heat dissipation fins that help increase the surface area of the bottom portion 1a. That is, more recessed portions are formed, in advance, than those necessary for disposing the LED modules 2, and some of them are made to serve as the recessed portions 15 for heat dissipation, thereby to make it possible to further enhance the heat dissipation effect as compared with those in the first and second embodiments.

The shape of the recessed portions 15 for heat dissipation is not limited to the squared-U shape in a cross section, and may be formed in any shape such as U or V in a cross section. In FIG. 10, the recessed portions 15 for heat dissipation are formed one between the LED modules 2, but so that the surface area of the bottom portion 1a is more increased, a plurality of the recessed portions 15 for heat dissipation may be formed between the LED modules 2.

The backlight devices discussed in the above-described embodiments can be mounted, together with the liquid crystal panel 9 (see FIG. 11), inside cases of a liquid crystal television, personal computer and the like. This makes it possible to easily replace the LEDs, whenever necessary, without disassembling the backlight device, leading to a product having increased ease of maintenance. Moreover, it is possible to provide liquid crystal display apparatuses that hardly experience deterioration of the illumination characteristics or breakage owing to heat generated from the LEDs, with no increase in thicknesses of the apparatuses, and to contribute to achieving slimness and lightness in weight of products equipped with such liquid crystal display apparatuses that are strongly demanded these days.

The embodiments described in the foregoing are in no way meant to limit how the present invention is practiced, and various changes can be made in practicing the present invention without departing from the spirit of the invention. That is, needless to say, the above-described embodiments can be used in any combination made appropriately in accordance with an application and an objective. For example, also in the backlight devices of the first and second embodiments, in which the LED modules 2 are arranged in the horizontal direction of the display screen, the recessed portions 15 for heat dissipation may be formed as in the third embodiment, and also in the third and fourth embodiments, in which the LED modules 2 are arranged in the vertical direction of the display screen, the plurality of the LED modules 2 may be disposed in series inside each of the recessed portions 10 as in the second embodiment.

Moreover, the backlight devices according to the present invention may be used for illumination in any type of image display apparatus other than the liquid crystal display apparatus. Further, a light source for use in the light source modules is not limited to an LED, but any other light emitting elements with heat generation may be used.

Industrial Applicability

According to the present invention, a backlight device includes: a light source module having a plurality of light sources arranged on a mounting board; and a case in which a plurality of such light source modules are disposed, the case having a bottom portion thereof formed of a metal plate in which a plurality of first recessed portions are so formed as to permit the light source modules to be disposed respectively therein. This makes it possible to simply and inexpensively provide a slim and compact, direct-type backlight device whose recessed portions can be formed easily by press-processing and being capable of efficiently dissipating heat generated from a mounting board. In addition, an outer surface of the bottom portion is so treated as to increase emissivity, and a second recessed portion having no light source module disposed therein is formed, leading to a further increased heat dissipation effect and hence contributing to a prolonged lifetime of light sources.

Moreover, the first recessed portions are provided, at least at one end, with the opening portion having the openable lid member; accordingly, the backlight device becomes superior in ease of manufacture and maintenance, the device making it possible to replace a light source or light source module from the outside of the device. Further, light source modules are provided in series, leading to improved workability in replacement of a light source and to further reduced maintenance costs.

Moreover, a backlight device according to the present invention is mounted in a liquid crystal display apparatus, thereby making it possible to provide liquid crystal display apparatuses such as a liquid crystal television and liquid crystal monitor superior in ease of manufacture and maintenance, and in durability, and also to contribute to achieving slimness and compactness of the apparatuses.

The invention claimed is:

1. A backlight device comprising:
    a light source module having a plurality of light sources arranged on a mounting board; and
    a case having a bottom portion thereof formed of a metal plate in which a plurality of first recessed portions are formed, each first recessed portion being fanned to permit the mounting board to be accommodated in the first recessed portion, wherein
    the first recessed portions have a depth greater than a thickness of the light source module, and
    an opening portion having an openable lid member is provided at least at one end of the first recessed portions.

2. The backlight device according to claim 1, wherein an outer surface of the bottom portion is so treated as to increase emissivity.

3. The backlight device according to claim 1, wherein at the bottom portion, a second recessed portion is formed in which the light source module is not disposed.

4. The backlight device according to claim 1, wherein the plurality of light source modules are arranged in series in each of the first recessed portions.

5. The backlight device according to claim 4, wherein an opening portion is provided at each end of the first recessed portions, and as said light source module, two light source modules are arranged in series in each of the first recessed portions.

6. The backlight device according to claim 4, wherein the plurality of light source modules are coupled together by a coupling mechanism.

7. The backlight device according to claim 1, wherein the light sources are LEDs.

8. A liquid crystal display apparatus equipped with the backlight device according to claim 2.

9. A liquid crystal display apparatus equipped with the backlight device according to claim 3.

10. A liquid crystal display apparatus equipped with the backlight device according to claim 1.

11. A liquid crystal display apparatus equipped with the backlight device according to claim 4.

12. A liquid crystal display apparatus equipped with the backlight device according to claim 5.

13. A liquid crystal display apparatus equipped with the backlight device according to claim 6.

14. A liquid crystal display apparatus equipped with the backlight device according to claim 7.

* * * * *